United States Patent [19]

Bleyle et al.

[11] 3,946,139

[45] Mar. 23, 1976

[54] VINYLIDENE CHLORIDE COPOLYMER LATEXES

[75] Inventors: Merrill Bleyle, Waltham; William D. DelVecchio, Randolph; Alex Trofimow, Brookline, all of Mass.

[73] Assignee: W. R. Grace & Co., Cambridge, Mass.

[22] Filed: Jan. 17, 1974

[21] Appl. No.: 434,031

[52] U.S. Cl.... 428/518; 260/29.6 TA; 260/29.6 SQ; 260/79.3 M
[51] Int. Cl.²............................................. B32B 27/08
[58] Field of Search 260/29.6 TA, 29.6 SQ, 79.3 M; 161/254; 117/138.8 E; 428/518

[56] References Cited

UNITED STATES PATENTS

| | | | |
|---|---|---|---|
| 3,318,721 | 5/1967 | Lineburg | 260/29.6 |
| 3,362,841 | 1/1968 | Menikheim et al. | 260/29.6 |
| 3,449,302 | 6/1969 | Nachbur et al. | 260/29.6 |
| 3,617,368 | 11/1971 | Gibbs et al. | 260/29.6 TA |
| 3,705,053 | 12/1972 | Emmons et al. | 117/140 A |
| 3,714,106 | 1/1973 | Smith et al. | 260/29.6 |
| 3,736,303 | 5/1973 | Smith et al. | 260/29.6 |
| 3,843,581 | 10/1974 | Gibbs et al. | 260/29.6 SQ |
| 3,850,726 | 11/1974 | Smith et al. | 117/138.8 E |

FOREIGN PATENTS OR APPLICATIONS

| | | | |
|---|---|---|---|
| 704,778 | 3/1965 | Canada | 260/79.3 |

*Primary Examiner*—Eugene C. Rzucidlo
*Attorney, Agent, or Firm*—Armand McMillan; C. E. Parker

[57] ABSTRACT

New vinylidene chloride copolymer latexes have been prepared with a hydroxyalkyl ester comonomer and acrylamido-2-methylpropane sulfonic acid. These products can be used to coat unprimed polyolefin film and yield laminates having dynamic peel strengths as high as 2400 g/in, that is equivalent to or greater than the peel strength of laminated uncoated polyethylene film itself.

2 Claims, No Drawings

VINYLIDENE CHLORIDE COPOLYMER LATEXES

THE PRIOR ART

Vinylidene chloride copolymer latexes can be formulated to provide excellent coatings for materials such as paperboard, glassine and polyolefin films, particularly packaging materials. These coated materials possess, along with flexibility, high resistance to grease and oil and to the passage of oxygen and moisture vapor.

When the substrates to be coated are synthetic polymer films, however, polyvinylidene latexes have a tendency not to wet such substrates adequately. This is particularly true of polyethylene and polypropylene. Coatings obtained in these instances are discontinuous and not very adherent and thus unsatisfactory. Wetting can naturally be improved by the addition of surface active agents but, unfortunately, the anionic emulsifiers used in latexes seem to act as release agents reducing the adhesion of the deposited film. Priming the substrate with some material that improves the adhesion of the polyvinylidene chloride layer can be resorted to, of course, but only at the expense of greatly reducing or eliminating the advantages that could otherwise be expected. Pre-treatment of the film surface by corona discharge has also failed to solve the adhesion problem.

The heat sealed polyolefin laminates that can be prepared from the polyvinylidene latexes of the art have dynamic peel strengths generally ranging between 10 to 300 grams per inch under ambient conditions of temperature and humidity. The best of these have been achieved by the introduction into the copolymer of internal wetting agents such as hydroxyalkyl esters and sulfoalkyl esters of alpha,beta-ethylenically unsaturated acids, as taught in Canadian patents 893,159 and 893,160. In spite of such improvements, which can be quite useful in many common applications, there exists a need for a latex that can provide the conventional benefits of polyvinylidene copolymers without interfering with the heat sealing capacity of, for instance, polyethylene film to itself. Such a latex must yield laminates with a dynamic peel strength at the 2400 g/in level.

SUMMARY OF THE INVENTION

A low-emulsifier, stable polyvinylidene chloride latex with good primerless adhesion to polyolefin film has been developed. When coated onto low density polyethylene film for instance, and impulse sealed, adhesion levels are obtained which are equivalent to the polyethylene to polyethylene heat seal. This performance is achieved by incorporating into the polyvinylidene copolymer, in addition to the minor proportions of conventional acrylic acid and ester type of monomers, about 0.5 to 25%, based on the total monomer, of a hydroxyalkyl ester of an alpha,beta-ethylenically unsaturated carboxylic acid having from 3 to about 5 carbon atoms, and from about 0.1 5% acrylamido-2-methylpropane sulfonic acid.

DETAILED DESCRIPTION

The vinylidene chloride copolymers of this invention may contain, depending on the use for which they are intended, from about 70 to 95% by weight of vinylidene chloride units, preferably from about 86 to 92% of the total monomer weight. The proportion actually selected for a given latex can be determined according to considerations well known to the art so that a balance may be established between the properties desired from the copolymer. Thus, for example, decreasing the net quantity of the monomer within the limits already stated will decrease the barrier properties of the polymer without necessarily affecting its capacity to adhere to various substrates.

Similarly, although the latexes of this invention can be restricted to copolymers which contain nothing but polyvinylidene chloride, a hydroxyalkyl ester and the acrylamido-alkylsulfonic acid already mentioned, other monomers are preferably added to the composition for their conventional contribution to such a system, be it as internal plasticizers or emulsifiers to prevent premature crystallization of the polymer and to increase the stability of the latex. Suitable comonomers of this type include ethylenically unsaturated carboxylic acids such as acrylic acid, methacrylic acid, itaconic acid, monobutyl itaconate, itaconic anhydride, and the like, which can constitute from about 0.1 to 5% of the copolymer and preferably from 1.5 to 4.0%. Other suitable monoethylenically unsaturated comonomers that can be used belong to the type containing no free acid or hydroxyalkyl groups. This category includes: alkyl esters of alpha,beta-ethylenically unsaturated monocarboxylic acid containing from 1 to 18 carbon atoms in the alkyl group such as methyl acrylate, ethyl acrylate, butyl acrylate, 2-ethyl hexyl acrylate, ethoxyethyl acrylate, methyl methacrylate, ethyl alpha-cyanoacrylate; alpha,beta-ethylenically unsaturated nitriles, such as acrylonitrile, methacrylonitrile, ethacrylonitrile; alpha,beta-ethylenically unsaturated amides, such as methacrylamide, acrylamide; monovinyl aromatics such as styrene, vinyltoluene; vinyl halides, such as vinyl chloride, vinyl bromide; diesters of alpha,beta-ethylenically unsaturated dicarboxylic acids, such as dimethyl itaconate, diethyl fumarate, dimethyl maleate; alkyl vinyl ethers, such as methyl vinyl ketone and so on. About 1 to 29% of said monomers or mixtures of said monomers may be used, although about 1 to 10% is preferred.

As intimated earlier, the copolymer of the invention must contain some hydroxy alkyl ester of an alpha,-beta-ethylenically unsaturated carboxylic acid. Such compounds should have from about 2 to 4 carbon atoms in the alkyl group and up to about 5 carbon atoms in the acid moiety. Illustrative compounds are hydroxyethyl acrylate, 2-hydroxypropyl acrylate, 4-hydroxybutyl-1-acrylate, hydroxyethyl methacrylate, 2,3-dihydroxy-propyl methacrylate, di(hydroxyethyl) itaconate, ethyl hydroxyethyl maleate, di(2,3-dihydroxypropyl) fumarate, hydroxyethyl crotonate, hydroxyethoxyethyl methacrylate, and the like. This type of monomer may constitute from about 0.5 to 25% of the copolymer although a 1.5 to 4% range is preferred. In addition, the copolymer of the invention must also contain between about 0.1 and 5% of acrylamido-2-methylpropane sulfonic acid, the best results, from the adhesion aspect, being obtained within a 0.5 to 1% range.

Any emulsifier capable of operating in an acid medium may be used in preparing the latex of this invention. For example, the soluble salts of an aryl sulfonic acid or of a long chain alkyl or aryl sulfate such as sodium dodecylbenzene sulfonate and sodium lauryl sulfate are satisfactory. The emulsifier is generally employed in an amount of 1 to 10 percent of the weight of the water-immiscible materials present. As pointed out elsewhere, however, the lower levels of this range are preferred for optimization of adhesion to polyolefins.

In the case of the dodecylbenzene sulfonate, the preferred concentration has proved to be about 0.1 to 0.6%.

Any of the conventional peroxides, persulfates, or azo compounds can be utilized as catalysts. Among the suitable catalysts may be mentioned potassium persulfate, sodium persulfate, hydrogen peroxide, peracetic acid, benzoyl peroxide, azo-bis-isobutyronitrile, cumene hydroperoxide, tertiary butyl perbenzoate, redox catalysts such as a combination of any of the peroxygen catalysts mentioned above together with reducing agents such as sodium sulfite, sucrose, ferrous gluconate, ascorbic acid, etc. The amount of the catalyst may be varied over a relatively wide range; generally about 0.1 percent to about 0.5 percent by weight of the materials to be polymerized is used.

The latex of the invention is formed by the polymerization of the selected monomers according to techniques known to the art which may involve the use of a seed latex or of a preshot polymerization. The rate of addition of the monomer mix may be programmed over a fixed period of time or it may be set according to the pressure prevailing in the reactor. As to the monomers and emulsifiers which remain when the preshot technique is employed, they may be fed into the reactor in one stream with the emulsifier solution added as a separate stream or, in the case of plant size polymerization, there may be used one stream consisting of an aqueous solution of the sulfonic acid monomer together with the emulsifier and another separate stream consisting of the rest of the monomers. Other variations known to the art may also be employed in this process. Polymerization can be carried out at any of a wide range of temperatures, although temperatures in the vicinity of 104°F are much preferred.

The polymeric latexes prepared according to this invention are characterized by having an average particle size of about 800 to 2200 A, a surface tension of about 38 to 58 dynes/centimeter, preferably 38 to 44, and a viscosity at 55% total solids of 10 to 55 cps (Brookfield No. 1 spindle, 23°C, 60 rpm). The latexes may be utilized over a wide range of total solids, e.g. as low as 20% or as high as 60%, with the range of 40 to 50% being favored for coating polyolefin film. Solids content may be adjusted by conventional vacuum stripping or by dilution, as the case may require.

Film formation can be accomplished by depositing a coating of the latex on any suitable substrate and heat drying it. As to the deposition, any type of mechanism or device capable of placing a uniform quantity in the desired thickness on the substrate may be employed. This includes: air knife coater, horizontal and vertical size presses, trailing blade, transfer rolls, gravure, bead coat, metering bar, spray coater and curtain coater. Deposition may be carried out in one or more applications. The lamination of the coated substrates will be illustrated later in terms of polyolefin film assemblies.

The following non-limiting examples will illustrate in greater detail the compositions, precesses and properties of the latexes of the present invention.

EXAMPLE 1

The following ingredients were used to prepare a typical latex according to this invention:

| Material | Parts by Weight |
|---|---|
| Vinylidene chloride | 87.5 |
| Methyl acrylate | 5.5 |
| Hydroxyethyl acrylate | 3.0 |
| Methacrylic acid | 3.0 |
| Acrylamido-2-methylpropane sulfonic acid | 1.0 |
| Sodium dodecylbenzene sulfonate | 0.8 |
| Sodium bisulfite | 0.07 |
| Ammonium persulfate | 0.037 |
| Demineralized water | 253.9 |

To prepare a latex from these ingredients, the water is charged into a reactor with the sodium bisulfite and a portion of the sodium dodecylbenzene sulfonate (about 4.7%). The batch is heated to 112°F while stirring and it is purged for 30 minutes at that temperature under a vacuum of about 27 inches. The resulting aqueous phase is then cooled to about 104°F.

A preshot of monomer mix (about 9% of the first four ingredients listed above) is then added, immediately followed by part of the ammonium persulfate (about 50% of the total required) in aqueous solution (0.8% solids). After the pressure has returned to about 2 to 3 psi and the temperature to about 104°F, continuous addition of a mix of all the remaining monomers, including the sulfonic acid and the sulfonate emulsifier, is begun and maintained for a period of five hour. If desired, the sulfonic acid monomer in aqueous solution at about 18.2% solids may be added as a separate stream simultaneously with the rest of the monomers during the five hour period. After completion of monomer addition, the batch is stirred for one more hour at the same temperature. The latex resulting is then stripped in vacuo to a solids content of about 50 to 54% by weight. It is ready for dilution to the concentrations desired for various applications.

EXAMPLE 2

Another latex was prepared with the ingredients and proportions listed in Example 1 except for the sulfonate and the persulfate proportions which were changed from 0.8 parts to 0.115 parts and from 0.037 parts to 0.0185 parts respectively. The polymerization was carried substantially in the same manner but with the first addition of ammonium persulfate being reduced to 5% of the total required.

EXAMPLE 3

In a large scale polymerization operation involving about 10,000 pounds of monomer mix in the proportions specified in Example 2, processing conditions were optimized by adding the sulfonic acid monomer and the sulfonate emulsifier in aqueous solution in one stream and, simultaneously during the five-hour period, the rest of the monomers as a second stream. The procedure otherwise remained unchanged. The solids contents of the sulfonic acid — sulfonate aqueous solution stream were 18.2% and 0.115 by weight respectively. There was obtained by this procedure a latex with application properties substantially equal to those of the latex of Example 2. This latex was free, however, of the greater part of the grits and coagulum which would have been produced in a batch of this size by the procedure of Example 2.

In the table below are provided further illustrations of various vinylidene chloride copolymer compositions representative of this invention, as well as of the performance which distinguishes them from those of the prior art.

Performance, reported in terms of dynamic peel strength of a polyethylene film laminate, was measured by first coating the latex to be tested, diluted to about 46% solids by weight, onto a 1.8 mil corona discharge treated polyethylene film by means of a wire wrapped rod. After drying, e.g. at 74°C for 2 to 5 minutes, two pieces of film were brought together, coated sides facing each other, and heat sealed at a powerstat setting of 11 for two seconds under 40 psi on a Sentinel impulse sealer. After standing at room temperature in ambient conditions, the peel strength of the heat seal was determined on an Instron tester. It is reported in the table in terms of grams per inch. The effect of ageing of the coated film on the peel strength of the bond ultimately obtained from coated material that has been stored, has also been tested by storing the coated films at 50°C for a period of 16 hours, followed by subsequent heat sealing in the manner just described.

strengths reported that laminates made from aged coated film are just as tightly sealed as laminates made from freshly coated film.

The coating of unprimed polypropylene film with the latexes just described will also impart heat seal strength equivalent to or greater than the tensile strengths of uncoated film.

EXAMPLE 11

In terms of latex storage stability, as measured by an accelerated storage test at 50°C, the compositions of this invention were found to be quite satisfactory when compared to conventional polyvinylidene chloride latexes.

This was determined by preparing several compositions with the monomer mix and the emulsifier content of the compositions of Examples 5 to 7. The only variation between these batches was the sulfonic acid monomer content which ranged from 0% (as in Example 7) to 1% (as in Example 5). The latexes were stored at

ADHESION OF POLYVINYLIDENE LATEXES TO POLYETHYLENE FILM

| Composition | Examples | | | | | | | | |
|---|---|---|---|---|---|---|---|---|---|
| | 1 | 2&3 | 4 | 5 | 6 | 7 | 8 | 9 | 10[2] |
| Vinylidene chloride | 87.5 | 87.5 | 87.5 | 87.5 | 87.5 | 87.5 | 86.4 | 86.4 | 87.0 |
| Methyl acrylate | 5.5 | 5.5 | 5.5 | 5.5 | 5.5 | 5.5 | 8.16 | 6.24 | 5.0 |
| Methyl methacrylate | — | — | — | — | — | — | — | — | 5.0 |
| Hydroxyethyl acrylate[1] | 3.0 | 3.0 | 3.0 | 3.0 | 3.0 | 3.0 | — | 1.92 | — |
| Methacrylic acid | 3.0 | 3.0 | 3.0 | 3.0 | 3.0 | 3.0 | — | — | — |
| Acrylonitrile | — | — | — | — | — | — | — | — | 3.0 |
| Acrylic acid | — | — | — | — | — | — | 0.96 | 0.96 | — |
| Emulsifier | 0.8 | 0.115 | 0.9 | 0.15 | 0.15 | 0.15 | 1.0 | 1.0 | 3.75 |
| Acrylamido-2-methyl-propane sulfonic acid | 1.0 | 1.0 | 1.0 | 1.0 | 0.5 | — | — | — | — |
| Sodium 2-sulfoethyl methacrylate[1] | — | — | — | — | — | — | 0.48 | 0.48 | — |
| % solids, as applied | 39.2 | 39.1 | 36.5 | 30.5 | 36.7 | 38.6 | 55 | 55 | 40 |
| Surface tension (dynes/cm) | 55 | 52.3 | 34.9 | 53.6 | 38.9 | 35.5 | — | 58 | 32.5 |
| Adhesion, initial (g/in) | 2000 | 2300 | 1600 | 1890 | 1920 | 1260 | 90 | 220 | <250 |
| aged (g/in) | 2500 | 2350 | 1550 | 1900 | 1900 | 1300 | 90 | 130 | 250 |

[1]Monomer mix of composition of Examples 8 and 9 are shown to illustrate effect of hydroxymethyl acrylate and sulfoalkyl ester monomers on adhesion to polyolefin films, as disclosed in Canadian patents 893,159 and 893,160.
[2]Example 10 shows a conventional polyvinylidene chloride latex (U.S. Patent 3,328,330) for comparison purposes.

Several interesting conclusions can be drawn from the adhesion data reported in the above table. If one considers for instance that heat sealed uncoated polyethylene film of the type used for the laminates in the table has a peel strength of 1800 to 2100 g/in when sealed and tested in the manner used in Examples 1 to 6, then one must conclude that the coating of said film with the compositions of the present invention does not interfere with the sealing ability of polyethylene, as demonstrated by the peel strengths of 1890 to 2300 g/in of the laminates of Examples 1, 2, 3, 5 and 6. In other words, the polyethylene-copolymer-polyethylene bond is just as strong or stronger than the polyethylene-polyethylene bond.

This is a rather surprising and unexpected contribution to an art which could only achieve, without film surface priming, peel strengths of 90 to 250 g/in as shown in Examples 8 to 10. In terms of film to film adhesion, the results in the table also bring out the decrease occasioned by increases in emulsifier concentration, with the optimum concentration range being about 0.115% to 0.8% of emulsifier based on total monomer. Similarly an optimum concentration of acrylamido-2-methylpropane sulfonic acid is indicated at levels ranging from 0.5% to 1% of the monomer charge.

As to the effect of ageing of polyolefin film coated with a polyvinylidene chloride composition of this invention, it becomes apparent on comparison of the peel 50% solids and the stability at 50°C was noted in terms of days. In assessing the results reported in the following table, it should be kept in mind that one day at 50°C is equivalent to three to four months at room temperature, with two weeks at 50°C equalling more than one year at room temperature. The concentrations of the sulfonic acid tested and the resulting stabilities are summarized below.

STABILITY OF POLYVINYLIDENE CHLORIDE LATEX ON STORAGE

| Acrylamido-2-methylpropane sulfonic acid content of copolymer | Latex Stability | |
|---|---|---|
| | at 50°C | at room temperature |
| 0% | 1 day | 3–4 months |
| 0.5% | 3 | 4–6 months |
| 0.75% | 6 | 6–9 months |
| 1.0% | 15 | 1 year |
| 1.0% | 25 | 1 year |
| Example 10 latex | 24 | 1 year |

As the data points out, the shelf life of the latexes increases with the concentration of the sulfonic acid monomer. The optimum level appears to be about 1%, which gives aged latex stability equivalent to the standard high emulsifier polyvinylidene latexes of the art as illustrated by the composition of Example 10.

EXAMPLE 12

The effect of buffering agents on the adhesion capacity of the compositions of the invention was studied using preparations according to those of Examples 1 and 3. The acidity of the original latexes was altered by addition of common buffers such as tetrasodium pyrophosphate and ammonium hydroxide. The buffered latexes were then used to make polyethylene laminates in the usual manner. The results of these operations are reported in the next table in terms of peel strength.

EFFECTS OF LATEX BUFFERING ON LAMINATE PEEL STRENGTH

| Latex | | pH | Peel Strength |
|---|---|---|---|
| Example 1 type | | 1.3 | 2050 g/in |
| + $Na_4P_2O_7$ | to | 1.5 | 500 |
| | to | 2.0 | 460 |
| | to | 2.5 | 320 |
| + $NH_4OH$ | to | 3.4 | 220 |
| Example 3 type | | 1.8 | 2150 g/in |
| + $Na_4P_2O_7$ | to | 3.5 | 255 |

It becomes apparent from this data that the adhesion capacity of the polyvinylidene chloride latexes of this invention decreases as the level of buffering agents in them increases.

It will be appreciated by the man skilled in the art that the compositions that have now been disclosed can undergo many variations in nature and proportion of components, as well as in processing detail, and still remain within the scope of the present invention as defined by the following claims. It will be appreciated also that the instant latexes possess great utility for the coating industry in that, in addition to their particular capacity for wetting and adhering to unprimed polyolefin film, they retain, to a high degree, the other properties such as flexibility and low moisture vapor and gas transmission rate for which conventional polyvinylidene latexes are prized.

What we claim is:

1. A laminate comprising at least one layer of unprimed polyolefin film bonded to a vinylidene chloride copolymer coating obtained from a composition comprising an aqueous dispersion of a copolymer which comprises, on a weight basis:
   a. about 70 to 95% vinylidene chloride,
   b. about 0.5 to 25% of an hydroxyalkyl ester of an alpha, beta-ethylenically unsaturated carboxylic acid having at up to 5 carbon atoms,
   c. about 0.1 to 5% 2-acrylamido-2-methylpropane sulfonic acid,
   d. about 0.1 to 5% of an ethylenically unsaturated carboxylic acid having up to 5 carbon atoms, and
   e. about 1 to 29% of copolymerized ethylenically unsaturated monomer containing no free acid or hydroxyalkyl groups.

2. A laminate comprising two layers of polyethylene film separated by a layer of vinylidene chloride copolymer, said copolymer having been applied to unprimed polyethylene film as an aqueous dispersion of the type described in claim 1 in which the copolymer comprises about 86 to 92% vinylidene chloride, about 1.5 to 4% hydroxyethyl acrylate, 1.5 to 4% methacrylic acid, 0.5 to 1% 2-acrylamido-2-methylpropane sulfonic acid, about 1 to 10% methyl acrylate and on monomer basis, 0.1 to 0.6% of an anionic emulsifier.

* * * * *